Patented Nov. 26, 1929

1,737,263

UNITED STATES PATENT OFFICE

ARTHUR J. MOXHAM, OF GREAT NECK, NEW YORK, ASSIGNOR, BY MESNE ASSIGNMENTS, TO J. P. LAFFEY, TRUSTEE, OF WILMINGTON, DELAWARE

METHOD OF TREATING GREENSAND AND THE LIKE

No Drawing.  Application filed September 1, 1923.  Serial No. 660,658.

My invention involves a method of treating greensand or glauconite and similar minerals to segregate the several metallic ingredients as sulfates. There have been many attempts to effect this result by treating greensand with sulfuric acid to produce a leach from which the silicious residue may be separated, the principal metallic ingredients being obtained as sulfates in the solution. These sulfates are subsequently extracted by crystallization, but the usual methods develop so many difficulties, that they have not been adapted to commercial practice. It is the object of my invention to so carry on this general method of procedure that it may be practiced with the economy, efficiency and uniformity that is necessary to make it commercially successful.

Greensand or glauconite contains a very large percentage of silica and varying percentages of ferric oxid, ferrous oxid, alumina and potash. Hereinafter, I shall describe my invention with special reference to the treatment of greensand, but I desire it to be understood that my invention is not necessarily limited to the treatment of greensand, as other minerals exist which are sufficiently similar in their composition to greensand to make the practice of my process or of some of its steps equally applicable to them.

To make this chemical method of treating such minerals a practical manufacturing method, it is necessary that factors be taken into consideration that are not in prominent evidence in laboratory practice. The principal factors are (1) minimizing the amount of water used, (2) minimizing the amount of extraneous heat employed, (3) curtailing the time needed for each step, (4) preparing the leach in such manner as to make it readily filterable and controlling the filtering operation to the same end, (5) avoiding the depositing and the crystallization of the metallic salts at stages of the operation where they are not readily reclaimable, and (6) minimizing the time of, and irregularities in, the crystallization steps of the process. Conditions that best meet some of these problems may be quite different from those that best meet others of these problems, and, therefore, the broad problem of making this process practical involves the carrying on of each stage of the process with due regard to subsequent stages thereof.

In the treatment of greensand, complications also arise due to the fact that the iron while mainly present as ferric oxid also exists in minor quantity, as ferrous oxid, so that it is desirable to simplify the treatment and produce only a single iron salt by some appropriate treatment at some stage of the process. One of the important features of my invention involves the conversion of all the ferric sulfate present into ferrous sulfate, and to do so under the conditions hereinafter described, whereby additional heat benefits are obtained by the reaction.

The filtration of the silicious residue is at best a slow and tedious operation, during which it is difficult to regulate the heat, and if the temperature falls much during the filtration, there is a tendency for the salts in the solution to crystallize out on the filter bed. This is particularly the case when a neutral or nearly neutral leach is employed. This produces a large amount of matter so fine that it becomes suspended in the solution and clogs the filter. My present invention involves a method of filtration which accepts, instead of seeking to eliminate, the deposit of crystallized salts on the filter and which recovers this deposit of fine clogging matter.

It is desirable that the first stage of the process be so conducted as to effect with rapidity the conversion of the metallic oxids into sulfates and their solution. I will now describe in detail one method which I have employed to this end, but this particular method is not specifically claimed herein, as it is described and claimed in my copending application, Serial No. 669,466, filed October 19, 1923. This particular method involves two distinct steps. First, that of digestion—during which the acid coverts the bases present, e. g., iron alumina and potash into sulfates and second, that of the water leach which dissolves and extracts the sulfates so produced from the admixed silicious material.

I disgest the greensand preferably with strong sulfuric acid. This has been done hertofore with the application of heat externally applied. I have found that if the proper amount of water be added, its contact with the acid generates sufficient heat to start the reaction that converts into sulfates the various bases in the greensand, and that after being started, the reaction is sufficiently exothermic to carry the digesting process to a rapid finish. By this means the use of extraneous heat for digesting is avoided. The amount of water should be governed by the mass or weight of acid used. I have found that around twenty-five per cent of the weight of the acid will give a temperature that quickly puts the whole mass into a boil. It will gain a temperature running from 135° C. to 150° C. according to the weight of the mass under treatment. Gradually as the reaction becomes completed, and the excess water has been driven off, the boiling subsides. The digestion can be conducted to a seventy-five per cent efficiency in a little over one hour, while two hours will carry the efficiency up to from ninety to ninety-five per cent, the efficiency being measured by the amount of base converted into sulfates.

I thus use water as the means of bringing the mass up to the critical temperature necessary to start the exothermic reaction that sulfatizes the bases, and then use the heat developed by the reaction itself to drive off the excess water. No extraneous fuel is needed to carry the digesting to a finish.

The digested material is, at this point, a pasty mass, but if allowed to stand soon becomes a fairly dry and porous mass easily handled and broken up, while finally if untouched it becomes crystallized and quite solid. I prefer to handle it as a porous mass.

My next step is to dissolve this digested material by leaching it in water. All these sulfates are moderately soluble in cold, and very soluble, in hot water. The time saved by using hot water, justifies the cost of the heating.

Moreover during the process of dissolving in the water there is a tendency to hydrolize some of the salts and otherwise to form a gel which greatly interferes with the filtration and this deleterious action commences slowly and increases rapidly with time. Hence the rapidity of this water leach or extraction is a large factor. I may at this stage proceed to filter the solution or I may avoid filtration entirely, but my present invention includes as a preferred feature, the filtration of the solution after preliminarily reducing the ferric sulfate in the manner hereinafter described, whereby, among other advantages, the leach is economically heated to prepare it for filtration.

I will now describe the manner in which, in accordance with my present invention, I effect a quick and efficient filtration with a minimizing of the difficulties which tend to develop in filtration of solutions of this character. Even at its best, filtration is slow. The solubility of the sulfates in water is so quickly reduced and crystals or precipitates form as a result of even a small drop in temperature that it is important that any finely suspended matter, whether part of the silicious residue or of such crystals or precipitates, be taken care of in such manner as not to materially slow down the filtering operation.

Over the bed of the filter made of any open material, such as either wood with numerous holes, or perforated lead sheets, the usual small pebbles or other coarse filtering material is laid; covering this I provide a removable cover or bed of asbestos, fine sand, or other filtering material. As filtration proceeds, any salt that is precipitated or crystallized out of the solution is held on this removable bed and after the filtration is finished the filter is washed by passing clear water through. As even this washing will not remove all of the salts the removable upper bed of material is taken off the filter and put into the leaching tank where the admixed salts are again leached out by water and so recovered.

The siliceous material, both of the ore and that added thereto from the filter is finally after washing either discarded, or used when advisable for glass making or after screening for steel foundry and sand blast purposes.

When the layer of encrusted material resulting from the fine suspended matter and the crystallization on the removable bed is scraped off, it restores a good working surface to the filter, a fresh layer of sand being added if needed. The metallic salts thus scraped off the filter are, all of them, extremely soluble in hot water. I, therefore, transfer them to the leaching tank while the washing is proceeding, or during the leach and after the extraction of the salts therein send the solution containing these salts to the filter again as an aqueous solution, which is sufficiently dilute and fluid to pass through the filter very quickly and practically without further recrystallizing thereon.

The process as above described enables me to carry on the leach with an excess of mineral and so leads to the reduction or elimination of free acid if this be desired, because I can economically filter this neutral liquor. It may be advisable, however, to finish the leach with free acid left in the solution. This may be finally neutralized after filtration and before or during the delivery of the filtrate to the crystallizing tanks.

I prefer to convert the ferric sulfate to ferrous sulfate at the end of the leach, after separation of the residue which readily settles and prior to the filtration already described. It has long been known that if metallic iron in proper proportion be added to ferric sulfate, while in solution in sulfuric acid, it will convert the ferric into ferrous sulfate, but I have discovered that this conversion can be effected rapidly and with the development of a large amount of heat without the presence of the acid, provided the temperature of the solution is brought to between 92° C., and 100° C., to start the reaction. About 95° C., seems to be the critcal temperature. The reaction at this temperature is strongly energetic. The temperature of 95° C., needed to start the reaction, can be economically obtained by the use of waste steam. The increase of temperature I obtain, is effective in checking the tendency of the metallic sulfates to crystallize in the leach and also reduces the crystallization occurring on the filter bed.

I prefer that the solution at this time should be slightly acid for I have discovered that when the metallic iron is added to the solution at the temperature named and there is some free acid present, the hydrogen evolved by the direct reaction of the acid and the iron, also becomes, at the temperature prevailing, a powerful reducing agent, cooperating in the reaction. The reducing action of the hydrogen upon the ferric sulfate is a very slow one at normal temperatures, but is energetic at temperatures between 90° C., and 100° C.

I have found the following plan to operate advantageously during the process of crystallization. As a first step the solution should be so concentrated as to permit all of the contained salts to crystallize out together. To get the most efficient yield it may be necessary to concentrate the mother liquor again after the specific gravity has been reduced by the coming down of the first crop of crystals. If this is done the second concentration should be to a higher specific gravity than the first. When working to obtain copperas and potash alum only, I have found it good practice to concentrate the solution to from 1.42 spec. gravity to 1.45 spec. gravity, the specific gravity being figured at normal temperature for this purpose, say 15° C. When this supersaturated solution cools to say about 30° C., a copious crop of mixed crystals of copperas and alum come down. When the crystallization reduces the specific gravity to about 1.34— the crystals should be removed and heat should be applied to the remaining mother liquor and this concentrated again. In this concentration the former high specific gravity should be exceeded, and it should be brought up to say from 1.47 to 1.50 or thereabouts. Upon cooling to normal temperature another crop of the mixed crystals is obtained. If the leach is an acid one, when the mother liquor becomes too reduced in quantity it should be set aside and when it has been sufficiently increased in volume by further additions from other leaches it should be again used for digesting. If it is a neutral leach it should be finally reconcentrated for still further crystallization. By these means the mixed crystals will be secured with the use of the minimum amount of heat.

The mixed copperas and alum crystals can best be separated by depending upon their difference of solubility as follows:—

I have found that at a temperature approximately say 40° C., almost all of the copperas will be dissolved and almost all of the potash alum be left behind in crystalline form. If the resulting copperas solution be now boiled down it can be crystallized and the small amount of alum contained therein will not materially affect its value. The two materials are thus separated by means of selective solubility. The separation therefore calls for only one further crystallization, viz, that of the copperas. It is economical and answers well for the ordinary commercial quality of salt.

If however the chemically pure product is needed, it can be obtained by the usual method of recrystallization. If an intermediate quality of crystals be needed it can economically be obtained by dissolving the mixed crystals at a much higher temperature till the supersaturated solution is reached. As it cools the alum will come out first. This may be advantageously repeated and then without getting out the last of the alum concentrate to a still greater extent and bring down all the remaining alum together with a first batch of copperas crystals. Lay these mixed crystals aside for further treatment. After this the further concentration and cooling of the solution will give copperas only. The small batch of mixed crystals can be added to the next main batch of similar crystals for similar treatment. The essential point is to so gather the crystals in each of these three steps, that the crystals resulting from the overlap period, (when the potash alum and the ferrous sulfate come out together as mixed crystals) are kept separate from both the preceding potash alum crystals and the subsequent ferrous sulfate crystals. By this method the overlapping or mixed crystals can be kept at a minimum and will not be an increasing mass.

Having thus described my invention, what I claim as new and desire to secure by Letters Patent is:

1. The method of treating silicious minerals containing ferrous and ferric iron in combined form, which consists in first treating the mineral to produce a solution of mixed ferrous and ferric sulfates and thereafter adding metallic iron to the solution while at a temperature of over 90° C. to cause an energetic reaction between the metallic iron and the ferric sulfate.

2. The process as described in claim 1 when the solution at the time the iron is added is somewhat acid in character whereby the reducing action is assisted by the hydrogen liberated during the reaction.

3. The step in the described method of treating silicious minerals which consists in filtering the leach resulting from treatment with sulfuric acid by distributing it upon a filtering bed and scraping the insoluble matter from the bed from time to time while the filtering proceeds to prevent clogging of the filter.

In testimony whereof, I have signed my name to this specification.

ARTHUR J. MOXHAM.